United States Patent
Fish et al.

(10) Patent No.: US 6,483,428 B1
(45) Date of Patent: Nov. 19, 2002

(54) REMOVABLE FRONT PANEL FOR AN ENTERTAINMENT DEVICE

(75) Inventors: Robert Fish, Gillette, NJ (US); Dennis Bushmitch, Somerset, NJ (US); David Braun, Denville, NJ (US); Chieh-Chung Chang, Plainsboro, NJ (US); Stephen Johnson, Erdenheim, PA (US); Mahfuz Rahman, South Brunswick, NJ (US); Luyang Li, Bordentown, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/934,810

(22) Filed: Aug. 22, 2001

(51) Int. Cl.⁷ ................................................. B60Q 1/00
(52) U.S. Cl. ..................... 340/425.5; 340/426; 340/430; 340/568; 340/687; 340/457; 455/346; 455/351; 455/345; 455/347; 455/348; 455/349
(58) Field of Search ............................. 340/425.5, 426, 340/430, 568, 687, 457; 455/346, 351, 345, 347, 348, 349

(56) References Cited

U.S. PATENT DOCUMENTS

| | | | | |
|---|---|---|---|---|
| 5,506,563 A | | 4/1996 | Jonic | 340/426 |
| 5,517,345 A | | 5/1996 | Joaille | 359/146 |
| 5,537,673 A | * | 7/1996 | Ngashima et al. | 455/346 |
| 5,554,966 A | * | 9/1996 | Iijima et al. | 340/687 |
| 5,705,976 A | * | 1/1998 | Howard | 340/426 |
| 5,822,728 A | | 10/1998 | Applebaum et al. | 704/254 |
| 6,067,278 A | * | 5/2000 | Owens et al. | 369/7 |

FOREIGN PATENT DOCUMENTS

| | | |
|---|---|---|
| JP | 8-318792 | 12/1996 |
| JP | 9-322278 | 12/1997 |

OTHER PUBLICATIONS www.panasonic.com.au/pa_main/v1/news/May_2001/SD₃_Card01a.html.

* cited by examiner

*Primary Examiner*—Daniel J. Wu
*Assistant Examiner*—Tai T. Nguyen
(74) *Attorney, Agent, or Firm*—RatnerPrestia

(57) ABSTRACT

An entertainment device is provided. The entertainment device includes a main processing station which provides an output signal. The main processing station includes a control interface. A front panel is removably connected to the control interface. The front panel includes a memory for storing multimedia content. The front panel provides control parameters to the main processing station. The content of the memory is provided to the main audio processing station for output. In addition, the front panel processes and presents the stored multimedia content as a portable device. Both control parameters and multimedia (e.g. audio or video) information may be exchanged between the front panel and the main processing station. The front panel also includes a telecommunications device and an alarm transponder.

28 Claims, 5 Drawing Sheets

REMOVABLE FRONT PANEL FOR AN ENTERTAINMENT DEVICE

BACKGROUND OF THE INVENTION

The present invention relates to an entertainment device, and, more particularly, to a removable front panel of an automobile entertainment device for storing content and/or operating as a stand-alone media player.

Automobile entertainment devices, sound systems in particular, frequently employ a variety of anti-theft features to discourage theft. One known feature is to provide the automobile audio device with a detachable front panel.

In use, the detachable front panel is a control interface. The removable front panel manages and initiates the functionality of the automobile entertainment device, namely the device actuation, volume control, tuning, etc. The front panel may include a small semiconductor memory containing a security identification number or stored tuner presets and the like. The absence of the removable front panel disables the functionality of the automobile entertainment device. Upon exiting the vehicle, an operator removes the front panel and physically carries the front panel away. Thus, much like a traditional ignition key or car alarm transponder, the front panel is carried by the operator until returning to the vehicle. In this way, the entertainment device absent the removable front panel is simply a "black box" having no readily accessible functionality.

Upon returning to the automobile and attaching the front panel to the entertainment device, the operator is once again able to operate the automobile entertainment device in the usual manner. Typically the operation of an automobile entertainment device includes playing recorded media inserted into the device such as audio cassette tapes and compact disks (CDs). The recorded media may also be transported periodically by the operator from the automobile entertainment device to a home or personal listening device.

As can be appreciated, with the advent of portable electronic devices such as car alarm transponders, personal digital assistants, MP3 players, portable global positioning systems (GPS), cellular telephones and the like, an operator of an automobile is likely to have several of such devices on his/her person in addition to the above front panel and/or recorded media.

SUMMARY OF THE INVENTION

A removable front panel for an automobile entertainment device is provided in which stand-alone functionality is enabled and the functionality of one or more of the above mentioned portable devices is consolidated into a single removable front panel device.

The present invention provides an entertainment device having a removably attached front panel. The device includes a main processing station for receiving control parameters and for providing an output signal to an output terminal thereof. The front panel is removably connected to the main processing station for providing control parameters to the main processing station. The front panel includes a panel memory for storing content, the content is provided to the main processing station for output.

The present invention further provides a removable front panel for controlling the operation of an automobile sound system, the automobile sound system includes a main memory. An audio processing means of the front panel codes and decodes audio content. A panel memory means stores audio content of the front panel. A communication means of the front panel is provided for contacting a remotely located party. A control means provides control parameters to the audio processing means and operates the communication means. An interface means links the front panel to the automobile sound system and provides control parameters to the automobile sound system. The audio content of the panel memory is provided to the automobile sound system for output and/or storage in the main memory.

BRIEF DESCRIPTION OF THE DRAWINGS

These and other features, aspects, and advantages of the present invention will become more fully apparent from the following description, appended claims, and accompanying drawings in which:

DESCRIPTION OF THE PREFERRED EMBODIMENT

Certain terminology used in the following description is for convenience only and is not limiting. The term "automobile entertainment device" as used herein refers to a media player typically found in an automobile, boat, motorcycle and the like for reproducing sound and/or video from recorded media and/or re-producing signals transmitted to a receiver thereof. The term "content" as used herein refers to any audio and/or video data provided to the device, including purely instructional data.

The present invention provides a removable front panel for use with an entertainment device that may be an automobile entertainment device. A main processing station receives control parameters from the front panel for providing and controlling an output signal. The front panel is removably connected to the main processing station for providing control parameters to the main processing station. The front panel includes a panel memory for storing content. The content of the panel memory is provided to the main processing station for output. The front panel functions as an independent personal entertainment device and also includes the functionality of one or more portable electronic devices such as a car alarm transponder, personal digital assistant, video player, MP3 player, portable global positioning system (GPS), cellular telephone and the like.

I. Main Components

Figure 1:
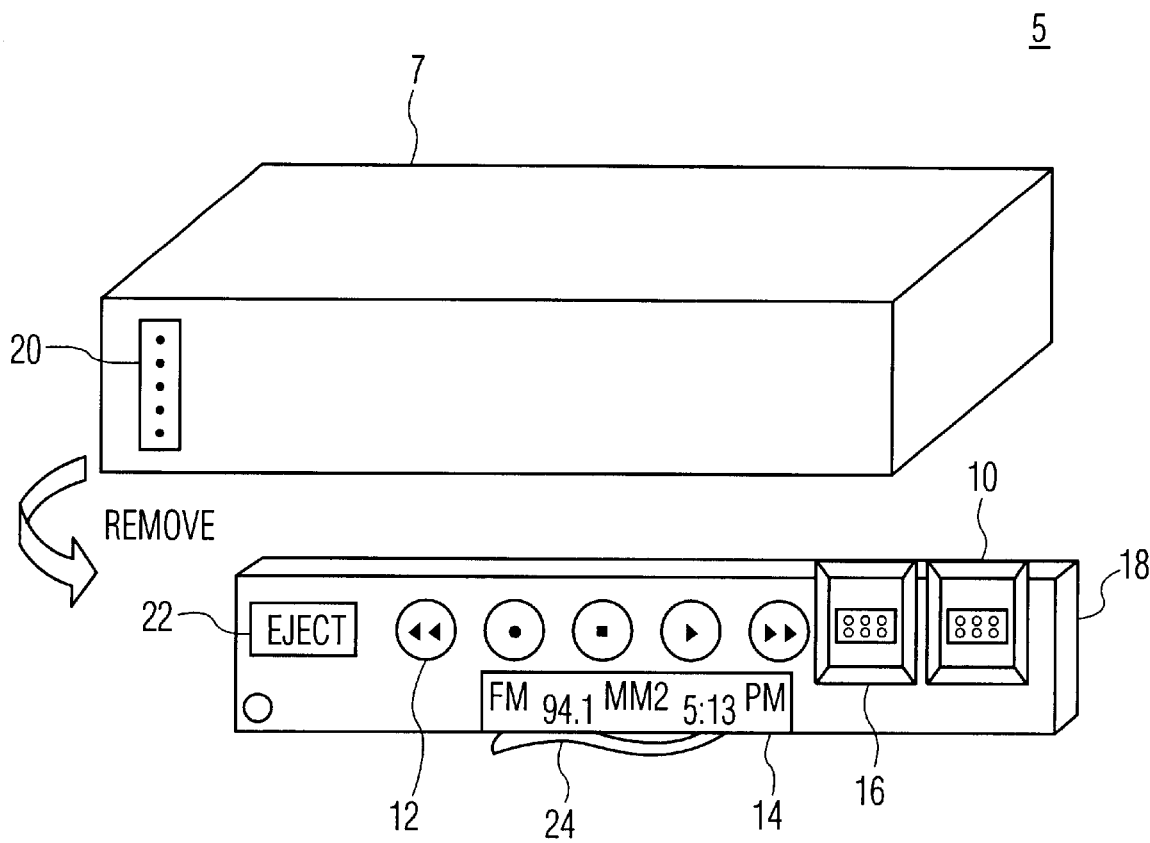
FIG. 1 is a perspective view of an automobile entertainment device in accordance with the present invention.

Referring now more specifically to the drawings, FIG. 1 shows a perspective view of an exemplary automobile entertainment device (AED) 5 in accordance with the present invention. The AED 5 includes a main processing station 7 and a front panel 10. In an exemplary embodiment, the AED 5 is operably linked to an instrument panel of a vehicle (i.e., vehicle electrical system not shown) for receiving a power signal and providing an audio and/or video output signals to sound and/or video output components (also not shown). Although described in terms of a vehicular/mobile system, those skilled in the art will recognize that the present invention is generally applicable to any entertainment device.

The main processing station 7 includes an interface 20 for the mechanical and electrical coupling of front panel 10 thereto. Front panel 10 includes a corresponding interface (not shown) opposite a front facing surface 22 for connecting to interface 20 of main processing station 7. In the exemplary embodiment, the interface 20 may be a uniform serial bus (USB) port. Those skilled in the art recognize that the interface 20 can be any number of known hardware interfaces and/or configured be any number of known data transfer protocols including wireless protocols such as infrared.

In an exemplary embodiment, the main processing station 7 includes audio and/or video processing circuitry for providing an output signal to appropriate image or sound producing components of the AED 5 (not shown). The main processing station 7 receives control parameters from front panel 10 via interface 20 to operate the audio and/or video processing circuitry therein.

The front panel 10 includes control panel or "controls" 12, display 14, input port 16, output port 18, and securing means 24. The front panel 10 is removably mounted to the main processing station 7 in any number of known manners recognized by those skilled in the art. The controls 12 of the front panel 10 provide an operator means for adjusting and/or entering control parameters to provide or adjust output signals therefrom. In an exemplary embodiment, the controls 12 are illuminated push-button switches, however those skilled in the art will recognize that the function of controls 12 can be performed by any number of switching technologies including "touch-screen" technology, via display 14, or transmitted control parameters provided to front panel 10 via a wireless communication device (not shown).

In an exemplary embodiment, display 14 of front panel 10 may be a liquid crystal display (LCD). The display 14 provides visible indicia of selected control parameters and the status of the AED 5. In an exemplary embodiment, the display 14 may further provide video images for viewing analog and/or digital video signals. In this alternative embodiment, the front panel 10 and/or main processing station 7 would include the necessary video processing circuitry for presenting the video signal to the display 14. Additionally, the circuitry may include an on screen display (OSD) circuit for providing textual data to the display such that control parameters are still visible during video presentation.

The input port 16 and output port 18 are provided for exchanging content between an external device and the front panel 10. For example, input port 16 is provided to operably link to an MP3 player, CD-ROM, personal computer (PC), or Secure Digital (SD) memory type device for importing content to the front panel 10. The input port 16 may also be configured to receive audio-visual data (A/V) from such devices as video-cassette recorders and/or digital versatile disc (DVD) players. Those skilled in the art recognize that ports 16 and 18 can be any number of known hardware interfaces and/or configured be any number of known data transfer protocols including wireless protocols such as infrared.

Output port 18 is provided for transferring output signals of the front panel 10 and/or main processing station 7 to an external playing device such as a listening or viewing device as described in the illustrative examples listed above.

The fastening means 24 of front panel 10 is provided such that an operator can easily secure front panel 10 to his/her person during transport. In an exemplary embodiment, fastening means 24 may be an elastomeric material contoured such that a thin web of material such as a belt or waistband can be secured between a surface of the fastening means and the front panel 10 to be sandwiched therebetween. Those skilled in the art will recognize that the fastening means of the exemplary embodiment is a matter of design choice and that a plurality of fastening methods and corresponding structures are known to those skilled in the art.

In the exemplary embodiment of FIG. 1, the front panel 10 of AED 5 is removably secured to the main processing station 7 for providing an operator of AED 5 means for adjusting and/or entering control parameters or, exchanging content from front panel 10 to main processing station 7. Those skilled in the art will recognize that front panel 10 and main processing station 7 need not be physically coupled to exchange content/parameters, merely linked either electrically or wirelessly. The necessity of linking the front panel 10 to main processing station 7 for operation provides a theft deterrent as known in the art. In an exemplary embodiment, when the front panel 10 is linked to main processing station 7, the operator may transmit a security code to main processing station 7 for increased security.

When the front panel 10 is linked to the main processing station 7, the front panel 10 and main processing station 7 are described as operating as an "integral" unit. In an exemplary embodiment, front panel 10 includes redundant A/V processing circuitry to that of main processing station 7. In this way, front panel 10 may be operated as a stand-alone entertainment device when not operating as an integral unit.

II. Main Processing Station

Figure 2:
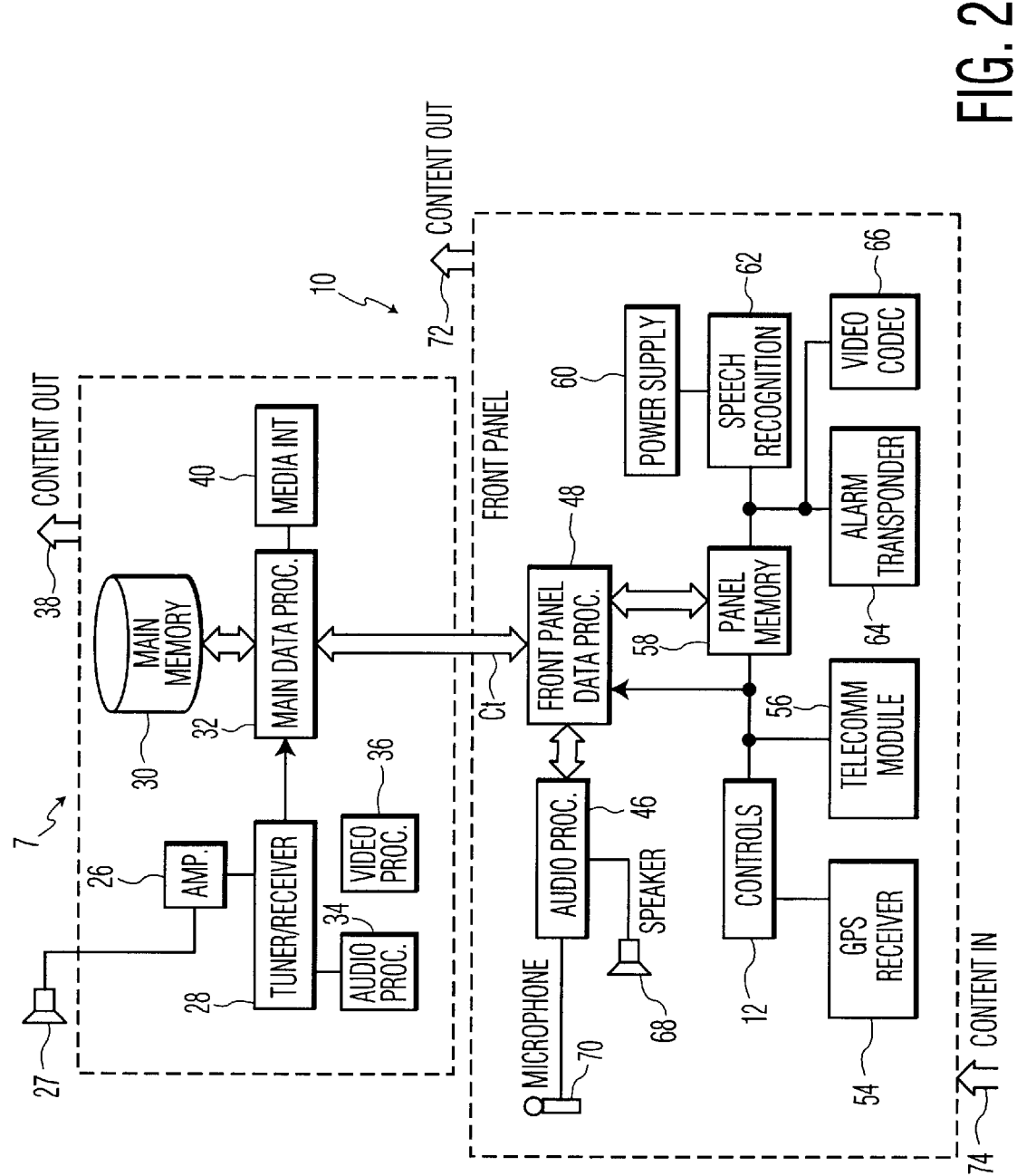
FIG. 2 is a high level block diagram of the automobile entertainment device of FIG. 1.

Referring now to FIG. 2, a high level block diagram of an exemplary AED 5 is shown. The AED 5 includes two separate components, main processing station 7 and front panel 10.

In an exemplary embodiment, main processing station 7 includes amplification section 26, tuner/receiver 28, main memory 30, main data processor 32, audio processor 34, video processor 36, media interface 40 and output terminal 38.

In the exemplary embodiment of FIG. 2, amplification section 26 includes video as well as audio amplification circuitry for providing an output signal of amplified magnitude a speaker system 27 or to output terminal 38. The audio and video signals input to the amplification section 26 are provided from tuner/receiver 28, memory 30, or media interface 40.

In the exemplary embodiment, the tuner/receiver 28 receives audio and or AV signals from a transmission source (not shown) for processing by audio processor 34 and video processor 36. As will be known to those skilled in the art, the video processing circuitry of tuner/receiver 28 of the exemplary embodiment may include circuitry for receiving analog or digital signal transmissions. The function of the tuner/receiver 28 is to decode the digital or analog transmission into the appropriate signals for amplification by the corresponding audio and/or video processor 34 and 36 respectively. For example, a digital AV receiver processes an audio/video bitstream, encoded, for example, according to the standard specified by the Advanced Television Systems Committee (ATSC). The exemplary system decodes the digital bitstream to present the decoded signals to output terminal 38 or in the case of video, to display 14 of front panel 10. Typically, the main processing station 7 would receive a digital AV signal from a transmission source, main memory 30, or media interface 40 and demodulate the digital signals or process the analog signals to recover the audio and/or video information. In the case of digital content, the tuner/receiver section 28 may perform real time audio and video decompression of various data streams (bitstreams) communicated to the device to recover the audio and/or video data.

In an exemplary embodiment, the tuner/receiver 28 may only employ audio processing circuitry for use as an automobile sound device or "radio" only. In this way, audio processor 34 processes the digital or analog audio data provided by the tuner/receiver 28. When digital audio information is received, the audio processor 34 may include a digital-to-analog converter (DAC) not shown that converts the digitized the audio data to analog audio data.

The main data processor 32 communicates control information with the tuner/receiver 28, amplification section 26, media interface 40 and main memory 30 as indicated via the solid lines. The solid double-ended arrow Ct, designates the content exchange function of the main processing station 7 and front panel 10. The main processing station 7 receives control parameters and/or content from front panel 10. In this way, an operator can adjust and/or enter control parameters from the front panel 10 as well as transfer content between the front panel 10 and the main processing station 7. Specifically, the main data processor 32 provides control data to the tuner/receiver 28, media interface 40, manages access to memory 30 and controls the signal processing content via the control parameters of front panel 10. The main data processor 32 may determine, for example, responsive to an operator selection, which transmitted or stored program is to be received, decoded/processed and displayed. Using this information the processor 32 controls the tuner/receiver to tune or access the channel or section of memory 30 that contains the desired program.

The main memory 30 of main processing station 7 is provided for receiving and storing content. Content can be transferred to the main memory 30 from a transmitted source via the tuner/receiver, via a pre-recorded media by way of media interface 40, or via the front panel 10. In the exemplary embodiment of FIG. 2, the main memory 30 is a non-volatile memory.

The media interface 40 is provided for reading pre-recorded media. In an exemplary embodiment, the media interface 40 may be a DVD-ROM or CD-ROM reader or a connector adapted to receive content data from such a medium. Those skilled in the art will recognize that media interface 40 may employ any number of technologies and carriage assemblies for reading a pre-recorded media unit (not shown)

III. Front Panel

Referring once again to FIG. 2, in an exemplary embodiment, front panel 10 may include, for example, audio processing section 46, panel data processor 48, display 14, control section 12, global positioning system (GPS) receiver 54, telecommunication module 56, panel memory 58, power supply 60, speech recognition module 62, alarm transponder 64, video processor 66, speaker 68, microphone 70 content output terminal 72 and content input terminal 74.

In the exemplary embodiment of FIG. 2, the audio processing section 46 includes audio amplification and decoding circuitry. In the exemplary embodiment, the audio processing section 46 includes circuitry for receiving analog or digital signals stored in panel memory 58 or provided to front panel 10 from main processing station 7 or through the content input terminal 74. The audio processing section 46 is redundant to that of main processing station 7. The purpose of audio processing section 46 is to enable the front panel 10 to operate independently of the main processing section 7. When the AED 5 is not operating as an integral unit (i.e., stand-alone), the audio processing section 46 can be utilized as an alternative to the audio processor 34 of main processing station 7.

In the exemplary embodiment, local power supply 60 is a rechargeable power supply such as a nickel-metal hydride or lithium ion cell. In the exemplary embodiment the power supply 60 of front panel 10 may be recharged by connecting a port of the front panel (not shown) to a source of power, such as an automobile cigarette lighter power adapter (also not shown). In an alternative embodiment, the front panel 10 may be recharged during integral operation (i.e., connection to main processing station 7).

Microphone 70 is provided for detecting an audio input sound to front panel 10. In an exemplary embodiment, the microphone 70 provides spoken utterances from an operator to speech recognition module 62 (SRM) for converting the spoken utterances into control parameters as described herein. Of course, microphone 70 may also be utilized for recording content such as dictation to either panel memory 58 or main memory 30 in the usual manner, or to provide voice signals to the telecommunications module 56, as described below.

In the exemplary embodiment, speaker 68 of front panel 10 is provided for use in stand-alone operation. In stand-alone operation, the front panel is powered by power supply 60, in this mode the speaker 68 and display 14 operate for playing a video and/or an audio media.

The panel memory 58 of front panel 10 is provided for receiving and storing content and system operational data such as lookup tables and the like. Content can be transferred to/from the main memory 30 of main processing station 7, or via the content input 74. In the exemplary embodiment of FIG. 2, the panel memory 58 may be a flash memory, employing, for example, a 56 key encryption scheme, such as the algorithm for content protected secure media (CPRM). In the exemplary embodiment, a portion of panel memory 58 is reserved for use by the panel data processor 48 to enable personal digital assistant (PDA) functionality. For example, an operator through controls 12 and display 14 may access stored telephone numbers, schedules, addresses and calendars when this functionality is activated.

The panel data processor 48 communicates control information with the audio processor, 46, display 14, controls 12, panel memory 58, speech recognition module (SRM) 62, GPS receiver 54, telecommunication section 56, alarm transponder 64 and video processor 66 as indicated via the solid lines. The solid arrow Ct designates the content exchange function of the main processing station 7 and front panel 10 managed by panel processor 48. The data processor 32 of main processing station 7 receives control parameters and/or content from front panel 10. The main data processor 32 may, for example, determine, responsive to an operator selection via front panel 10, which transmitted or stored content is to be received, decoded and displayed/reproduced. In this way, an operator can adjust and/or enter control parameters from the front panel 10 as well as transfer content between the front panel 10 and the main processing station 7.

The SRM module 62 of the exemplary embodiment is responsive to an input audio signal for dynamically converting the audio data into recognized control parameters. Generally, the microphone 70 provides audio signals to an input port of the SRM module 62 for processing. The SRM module 62 performs signal filtering to identify audio segments including speech components and separate the speech segments from the audio input. The SRM module 62 then processes the speech signals through filters to identify various components which are applied to speech models, such as hidden Markov models to convert the audio input into "phonemes" or speech parts. The phonemes are sent to a word matcher, which selects a matching word from a word database stored in main memory 58 or main memory 30 based on the identified phonemes of each word. The selected database word is then output from the SRM 62 for conversion to a control parameter by panel data processor. As described above, video processor 36 or panel video processor 66 may also be employed for displaying text corresponding to the control parameters on the display 14. The exemplary word database includes a context module that distinguishes between homophones such as "to," "too" and "two." An exemplary SRM suitable for use with the present invention is described in U.S. Pat. No. 5,822,728 entitled MULTISTAGE WORD RECOGNIZER BASED ON RELIABLY DETECTED PHONEME SIMILARITY REGIONS.

The telecommunication module 56 of the exemplary embodiment provides telephone service to an operator. In the exemplary embodiment, the speaker 68, microphone 70, controls 12 along with the telecommunication module 56, function as a cellular/wireless telephone. For example, an operator dials a phone number through the controls 12, the telecommunication module 56 operates in the usual manner for establishing cellular/wireless communication. In an alternative embodiment, the SRM module 62 can be utilized for converting spoken utterances into phone numbers. Those reasonably skilled in the art will recognize that the operation of the telecommunication module is well known in the art, as such the description of such is omitted here for the purposes of brevity.

In an exemplary embodiment, a GPS receiver 54 is provided for use with display 14, microphone 70 and speaker 68. In the exemplary embodiment, GPS signals are received by GPS receiver 54 and a map appropriate for the geographic location of front panel 10 is shown on display 14. Those reasonably skilled in the art will recognize that GPS receivers are well known in the art, as such the description of such is omitted. Speaker 68 may be employed in the exemplary embodiment for giving audible indications of GPS signals. For example, an audible tone or spoken alert may be given to operators approaching known landmark/destination or the operator may be given audible directions to a landmark/destination.

Further, In the exemplary embodiment, microphone 70 and speaker 68 can be used in conjunction with the GPS receiver 54 and/or telecomm module for communicating with a concierge service such as the ONSTAR® system.

In an exemplary embodiment, the alarm transponder 64 is provided for transmitting and/or receiving signals with an alarm base component (not shown). The alarm transponder of the exemplary embodiment is programmable via display 14 and controls 12 for selecting a protocol/frequency of a desired alarm manufacturer. The protocol and frequency are stored in the panel memory 58 or main memory 30.

For example, an operator purchasing a third party alarm system for an automobile employing the AED 5 of the present invention. Rather than utilizing the portable transponder provided with the purchased alarm system, the operator utilizes the alarm transponder 64 of front panel 10. The operator selects the appropriate manufacturer and alarm model number stored in memory 58 or 30 via controls 12 (the stored manufacturers and model numbers appearing on display 14 of front panel 10). Once the appropriate manufacturer and model number are selected, the alarm transponder is programmed to operate in accordance with a specific frequency/protocol stored in memory (the operator may need to input a specific serial number of the manufacturer via controls 12 to provide a unique transponder signal). In this way, the front panel 10 of the present invention may function as a universally programmable alarm transponder.

The video processor 66 of front panel 10 is redundant in function to video processor 36 of main processing station 7. The purpose of video processing section 66 is to enable the front panel 10 the ability to produce video images to panel 14 independently of the main processing section 7. When the AED 5 is operating as an integral unit, the video processing section 66 can be utilized as an alternative to the video processor 36 of main processing station 7. The operation of video processing station 66 is identical to that of video processor 36, therefore, it description has been omitted for the purposes of brevity.

Any number of the above modules of front panel 10 may be omitted for producing a cost effective AED 5. For example, it may be desirable to eliminate redundant modules, or offer a front panel 10 which is only utilized for a subset of the features described above.

IV. AED Content Exchange

The functionality of the panel processor 48 of front panel 10 described herein is equally applicable to main data processor 32. Those skilled in the art will recognize that the processing functionality can be performed wholly by one or the other processor or shared in a distributed computing embodiment.

Figure 3:
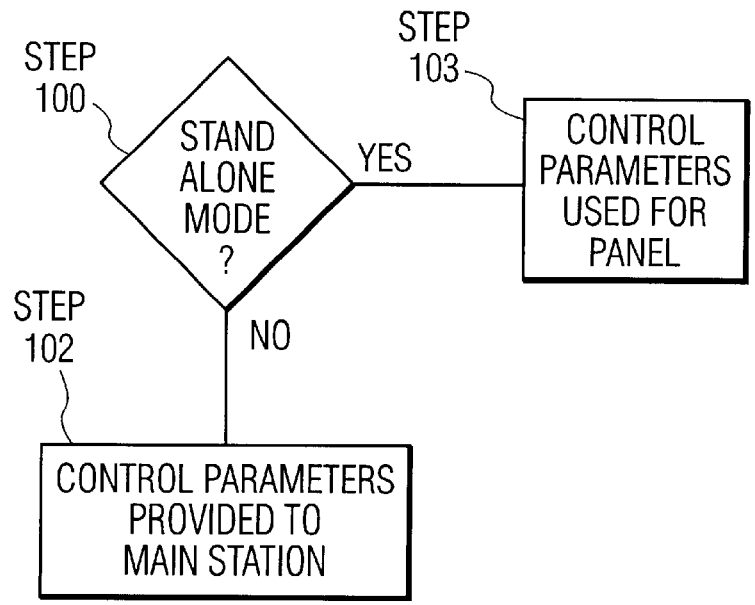
FIG. 3 is a flow chart illustrating the operation of the front panel of the automobile entertainment device of FIG. 1.

Referring now to FIG. 3, the operation of the AED 5 is shown as a flow chart in accordance with an exemplary embodiment of the invention. At step 100 the panel processor 48 determines whether or not the front panel 10 is connected to the main processing station 7 (i.e., integral or stand-alone mode). Depending upon the determination of step 100, the front panel will proceed to step 102 or 103, providing control parameters to the main processing station 7 or utilizing them for the control panel 10 respectively.

Figure 4:
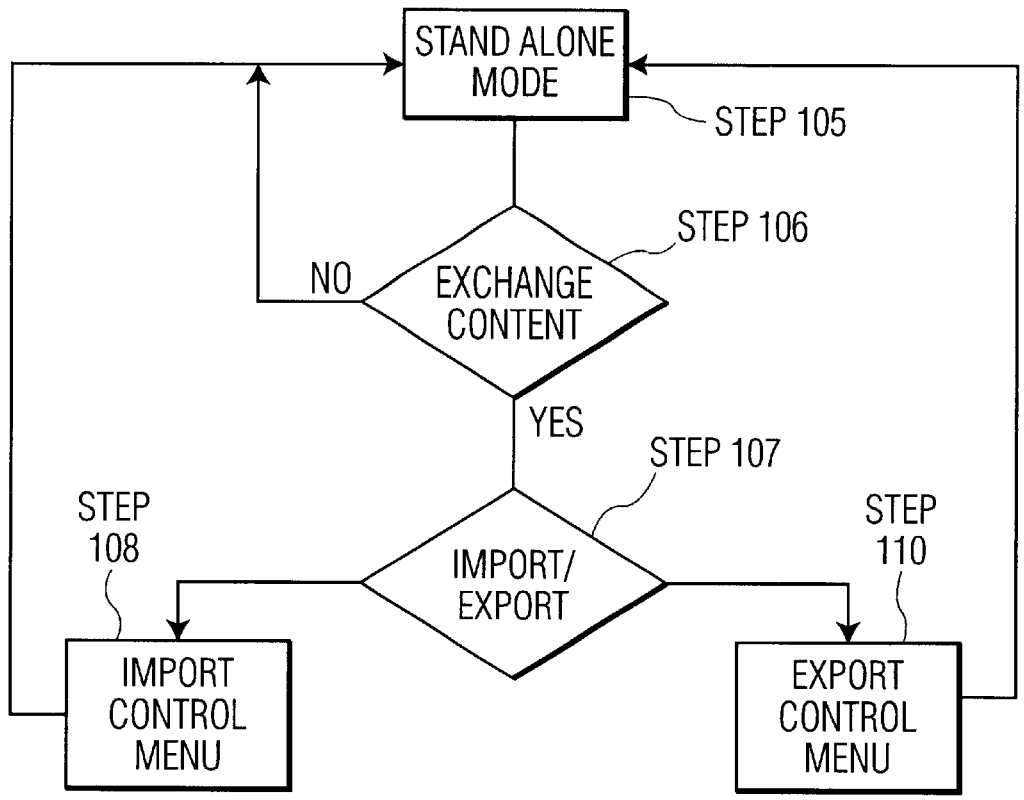
FIG. 4 is a flow chart illustrating the operation of exchanging content between the automobile entertainment device front panel in accordance with the present invention.

FIG. 4 is a flow chart of the stand-alone operation of front panel 10 in stand-alone mode in accordance with an exemplary embodiment of the invention. At step 105, the panel data processor 48 determines that front panel 10 is in the stand-alone mode. At step 106, the panel data processor 48 determines whether or not a content exchange is to be initiated. If a content exchange is not to be initiated, the panel data processor 48 continues to loop through steps 105 and 106. While the data processor 48 loops through steps 105 and 106, all stand-alone system functions are enabled, such as A/V playback, telecommunication, GPS and the like.

If a content exchange is to be initiated, the process proceeds to step 107 to identify if the content exchange is an import or export function. The panel data processor 48 receives a control parameter from the operator (typically via the controls 12), and the process proceeds to the corresponding import or export step 108 or 100 respectively.

Figure 5:
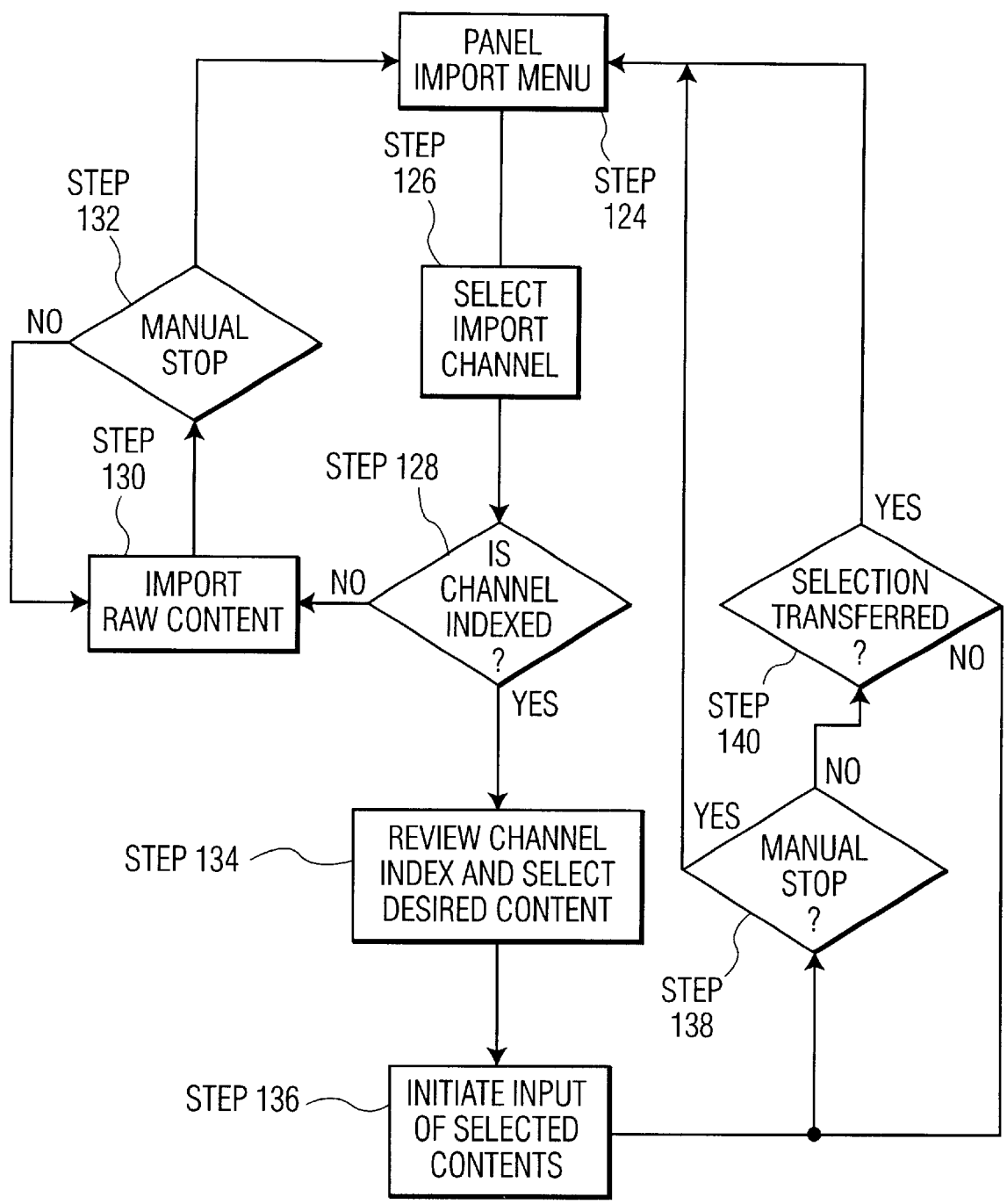
FIG. 5 is a flow chart illustrating the operation of importing content to the front panel in accordance with the present invention.

Referring now to FIG. 5, a flow chart of the import operation of front panel 10 in accordance with an exemplary embodiment of the invention is shown. Upon selection of the import procedure at step 124, the operator is presented with an import menu on display 14 for selecting content to be imported to content in terminal 74 of front panel 10. At step 126, via controls 12, the operator can select among a plurality of channels to import (channels being designated sections of a media having pre-recorded content). At step 128, the panel data processor 48 determines whether or not the media employs channel indexing. If the media does not have channel indexing, the process proceeds to steps 130 and 132. In steps 130–132 an operator can import as much raw data as necessary, then the process returns to step 124. At step 134, an operator can select a desired channel for import from the pre-recorded media. At step 136, the operator can select a subset of content from the pre-recorded media channel. At step 138, the operator can manually halt the import process through controls 12. If not manually halted in step 138, the process continues until completion in step 140 and the process returns to step 124.

For example, upon operably linking a memory device such as an MP3 player to the content in terminal 74, the front panel 10 scans media of the player for index indicia for view on display 14. An operator can then select desired content for import, or where no indicia is available, simply opt to import all (raw) data. Similarly, selected content can be imported from main memory 30 to panel memory 58 where it may be played by the front panel 10 in stand-alone mode.

Figure 6:
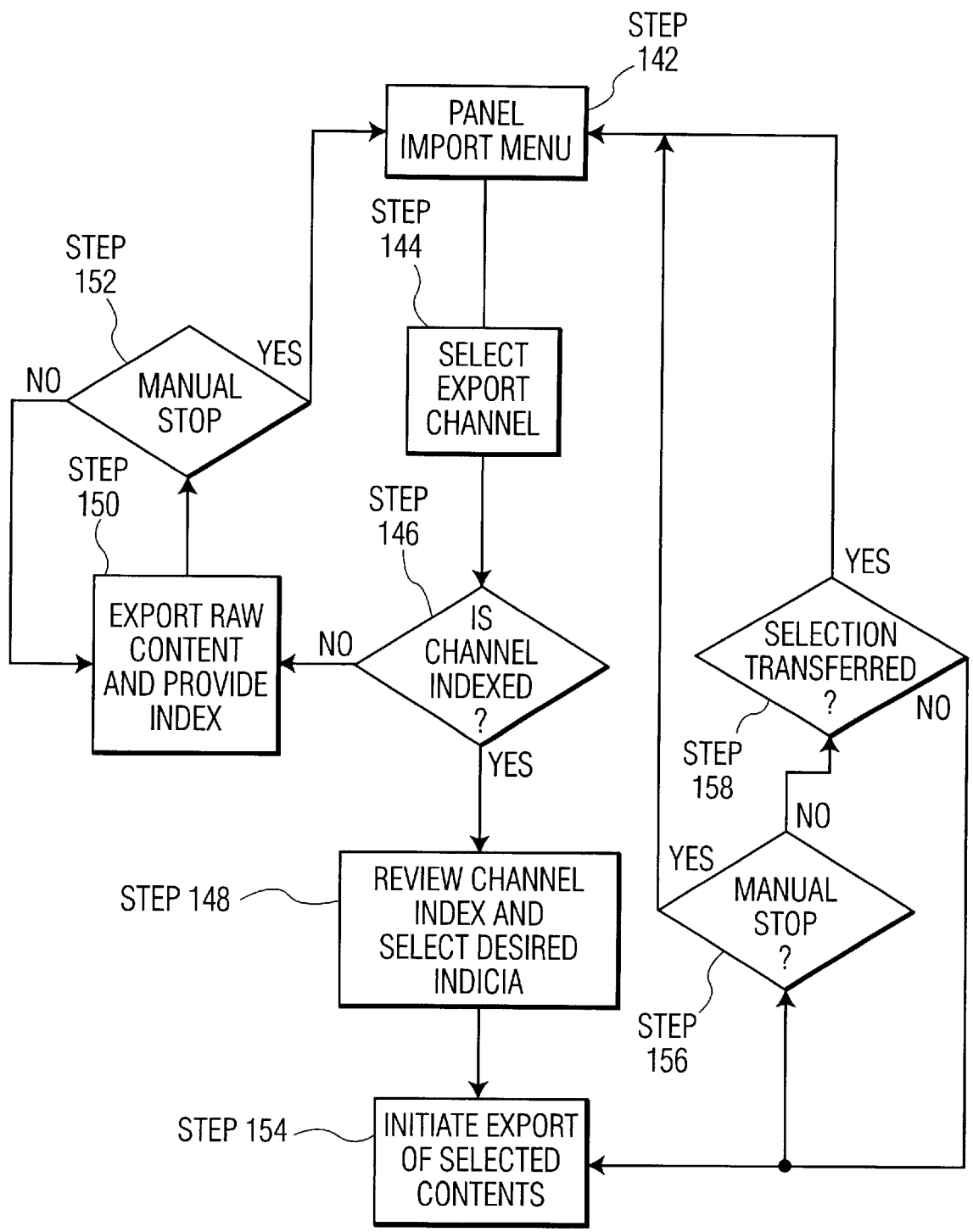
FIG. 6 is a flow chart illustrating the operation of exporting content from the front panel in accordance with the present invention.

Referring now to FIG. 6, a flow chart of the export operation of front panel 10 in accordance with an exemplary embodiment of the invention is shown. Upon selection of the export procedure at step 142, the operator is presented with an export menu of display 14. At step 144, via controls 12, the operator can select among a plurality of channels to export from panel memory 58 main memory 30 or an externally linked device (not shown). At step 146, the panel data processor 48 determines whether or not the media employs channel indexing. If the media does not have channel indexing, the process proceeds to steps 150 and 152 where indexing may be provided by an operator via controls 12. In steps 150–152 an operator can export as much raw data as necessary, then the process returns to step 142. At step 148, an operator can select a desired channel for export from the memories 58 and 30, external device or pre-recorded media of main processing station 7. At step 154, the operator can select a subset of content from the pre-recorded media channel for export. At step 156, the operator can manually halt the export process through controls 12. If not manually halted in step 156, the process continues until completion in step 158 and the process returns to step 142.

For example, similar to the import operation described above, upon operably linking a memory device such as an MP3 player to the content output terminal 72 or exchanging the data from front panel 10, the front panel 10 searches for index indicia. An operator can overwrite content to correspond to available index indicia, or be prompted to provide index indicia via controls 12 for raw export.

Although the exemplary system is described in terms of a hardware implementation, it is contemplated that some or all of the hardware functionality may be practiced entirely in software running on an AED system. This software may be embodied in a carrier such as magnetic or optical disk or a radio frequency or audio frequency carrier wave.

It will be understood that various changes in the details, materials, and arrangements of the parts which have been described and illustrated above in order to explain the nature of this invention may be made by those skilled in the art without departing from the principle and scope of the invention as recited in the following claims.

What is claimed:

1. An automobile entertainment device comprising:
   (a) a main processing station- for receiving control parameters and for playing entertainment content to provide an output signal to an output terminal thereof; and
   (b) a front panel removably connected to the main processing station for providing control parameters to the main processing station, the front panel including a panel memory for storing the entertainment content, whereby the entertainment content of the panel memory is provided to the main processing station for output.

2. The automobile entertainment device of claim 1, wherein the front panel includes an audio processor for processing and recording audio content in the panel memory.

3. The automobile entertainment device of claim 1, wherein the front panel includes a video processor for processing and recording video content in the panel memory.

4. The automobile entertainment device of claim 3, wherein the front panel includes an independent audio processor which processes the stored audio content for reproduction.

5. The automobile entertainment device of claim 4 wherein the entertainment device includes a main memory in which the audio content can be stored for repeated use.

6. The automobile entertainment device of claim 1, wherein the front panel includes an independent power source.

7. The automobile entertainment device of claim 6 wherein the power source is rechargeable and receives a recharging signal from the processing station.

8. The automobile entertainment device of claim 1, wherein the processing station and the front panel transfer control parameters via a universal serial bus (USB) interface.

9. The automobile entertainment device of claim 8, wherein the processing station and the front panel transfer control parameters via wireless transmissions.

10. The automobile entertainment device of claim 9, wherein the wireless transmission is an infrared signal.

11. A removable front panel for controlling the operation of an automobile sound system, the automobile sound system including a main memory, the front panel comprising:
    (a) a panel memory for storing audio content;
    (b) an audio processor operably linked to the memory;
    (c) a control interface for providing control parameters to the audio processor and the automobile sound system; and
    (d) a content interface for transferring audio content between the panel memory and the main memory.

12. The front panel of claim 11, wherein the content interface is configured for interconnection with a portable memory device for importing/exporting the content of the portable memory device to the panel memory.

13. The front panel of claim 12, wherein the portable memory device is a device selected from a group consisting of an MP3, player Secure Digital memory device, and a portable computing device.

14. The front panel of claim 11, further comprising:
    an independent power source for powering the front panel.

15. The front panel of claim 14, further comprising:
    a sound device interface for operably linking a sound producing device.

16. The front panel of claim 14, wherein the panel memory is configured for secured storage.

17. The front panel of claim 16, wherein panel memory implements an algorithm for content protected secured media (CPRM) to provide secure storage of the audio content.

18. A removable front panel for controlling the operation of an automobile sound system, the automobile sound system including a main memory, the front panel comprising:

(a) audio processing means for coding and decoding audio content;

(b) panel memory means for providing stored audio content to the audio processing means;

(c) communication means for contacting a remotely located party;

(d) control means for providing control parameters to the audio processing means for operating the communication means; and (e) interface means for linking the front panel to an automobile radio and providing control parameters to the automobile radio, whereby, the audio content of the panel memory is provided to the automobile radio for output and/or storage in the main memory.

19. The front panel of claim 18, further comprising:

an input means for accepting data to be communicated by the communication means.

20. The front panel of claim 19, wherein the input means includes an alpha-numeric keypad.

21. The front panel of claim 20, wherein the input means includes a microphone.

22. The front panel of claim 21, further comprising:

output means for providing data transmitted to the communication means from the remote location.

23. The front panel of claim 22, wherein the output means includes and LCD display.

24. The front panel of claim 22, wherein the output means includes a sound producing device.

25. The front panel of claim 19, wherein the communication means is a cellular communications transceiver.

26. The front panel of claim 19, further comprising:

global positioning means responsive to global positioning signals for indicating the geographic location of the front panel via the LCD display.

27. The front panel of claim 18, further comprising:

a transponder for communicating with an automobile car alarm.

28. The front panel of claim 27, wherein the transponder provides an audible signal upon detection of a signal from the automobile car alarm.

* * * * *

UNITED STATES PATENT AND TRADEMARK OFFICE
CERTIFICATE OF CORRECTION

PATENT NO.   : 6,483,428 B1
DATED        : November 19, 2002
INVENTOR(S)  : Robert Fish et al.

It is certified that error appears in the above-identified patent and that said Letters Patent is hereby corrected as shown below:

<u>Title page,</u>
Item [75], Inventors, "Mahfuz Rahman" should read -- Mahfuzur Rahman --.

Signed and Sealed this

First Day of July, 2003

JAMES E. ROGAN
*Director of the United States Patent and Trademark Office*